United States Patent [19]
Friend et al.

[11] 4,281,388
[45] Jul. 28, 1981

[54] TACHOMETER

[75] Inventors: Kenneth D. Friend, Cedar Falls; David W. Gadtke, Waterloo, both of Iowa; Duane H. Ziegler, Colona, Ill.

[73] Assignee: Deere & Company, Moline, Ill.

[21] Appl. No.: 55,834

[22] Filed: Jul. 9, 1979

[51] Int. Cl.³ ............................................. G01P 3/48
[52] U.S. Cl. ..................... 364/565; 73/488; 324/162; 324/166
[58] Field of Search ............... 364/565; 324/161, 166, 324/168, 172, 173, 162; 235/92 FQ; 73/488, 578

[56] References Cited

U.S. PATENT DOCUMENTS

| | | | |
|---|---|---|---|
| 3,968,434 | 7/1976 | Dixon et al. | 364/565 X |
| 4,086,532 | 4/1978 | Aronson et al. | 324/166 |
| 4,166,976 | 9/1979 | Ruhnau et al. | 324/166 |
| 4,167,699 | 9/1979 | Baker | 324/171 |
| 4,179,656 | 12/1979 | Wagner | 364/565 X |
| 4,181,883 | 1/1980 | Beeghly et al. | 364/565 X |

Primary Examiner—Edward J. Wise

[57] ABSTRACT

A tachometer for monitoring several functions on an implement, such as engine, shaft and ground speeds. A microprocessor receives a-c input signals which vary in frequency as the shaft or ground speeds change. A time window synchronized with a rising edge on the desired input signal is provided during which the number of falling edges are counted. A running total weighted average of a number of successive counts is used to update a digital readout indicating speed. Each new count is compared with the previous average and, if a sudden speed change occurs, the processor shifts to a fast update mode in which the new count is used to immediately update the readout. Programming switches are provided for selecting the proper ground speed time window for a given tire size and for providing a ground speed indication in either kilometers per hour or miles per hour.

53 Claims, 13 Drawing Figures

TACHOMETER

BACKGROUND OF THE INVENTION

The present invention relates generally to a speed monitor and more specifically to a digital tachometer.

On certain farm implements it is advantageous to be able to monitor several operating parameters. On a combine, for example, proper ground speed, header shaft speed, cleaning fan speed and engine speed are necessary for efficient removal of the crop from the field. Such problems as malfunctions, misadjustments, clogging and excessive loading can be quickly detected by monitoring the various speeds.

Although numerous digital tachometer devices are available, heretofore none have been completely satisfactory. Some require a separate instrument for each function and, as a result, are high in cost and require much panel space at the operator's station.

Accuracy is a problem with many tachometers. Some respond well during periods when the speed monitored is steady but have a slow response during acceleration and deceleration. Averaging techniques are often used which do not provide a true indication of speed and which can even, in certain situations, give an indication that speed is increasing when in fact the speed has just begun to decrease. If the device is made to respond quickly for accurate readings during periods of acceleration or deceleration, the display often is difficult to read during operation at steady speeds since small changes in the reading will cause constant change in the least significant digit. To prevent constantly changing digits at steady speeds, accuracy is often compromised.

Commonly, magnetic transducers detecting passage of teeth on a rotating member provide an alternating current input to the device which varies in amplitude with the angular velocity of the rotating member. At low speeds, problems of noise and sensitivity affect accuracy. Jitter often occurs because circuitry is used which counts the number of cycles or pulses occuring during a given clock period begun at random. This random counting can result in different counts for consecutive clock periods even if the speed remains constant. This causes the least significant digit to change constantly, which is annoying to the operator.

Ground speed measurements are usually derived from the rotational speed of a drive shaft and are affected by the size of the tires provided on the implement. If the tire size is changed, the ground speed indicated will be inaccurate. To correct for such changes, or alternatively to set the device to read in different units such as kilometers per hour rather than miles per hour, often requires an adjustment of a trimming potentiometer while a signal generator connected to the tachometer input simulates a signal for a given speed.

SUMMARY OF THE INVENTION

It is, therefore, an object of the present invention to provide a digital tachometer which eliminates the aforementioned problems.

It is another object of the present invention to provide an improved tachometer which monitors several fucntions. It is a further object to provide such a tachometer which utilizes a single microprocessor.

It is yet another object of the present invention to provide a tachometer which provides accurate readings without jitter both at relatively steady speeds and during periods of rapid acceleration or deceleration. It is still another object to provide such a tachometer which has a relatively sensitive input highly immune to noise.

It is a further object of the present invention to provide a tachometer with a digital output that is relatively jitter-free and easy to read.

It is yet another object of the invention to provide a tachometer for selectively monitoring one of a plurality of functions wherein a correct immediate response is provided when a new function is selected.

It is still another object of the present invention to provide a tachometer which provides a ground speed indication and can be quickly and easily adjusted for the correct reading in either metric or the U.S. equivalent even for varying tire sizes.

A digital tachometer utilizes a microprocessor for monitoring several functions, such as combine engine RPM, cleaning fan speed, header backshaft speed, and ground speed. Magnetic pickup devices provide a-c input signals with frequencies proportional to the speeds to be monitored. An input circuit with a filter and Schmitt trigger connected to each pickup device converts the signals to square waves which are fed to a microprocessor. The microprocessor selectively converts the square wave signals to ground or shaft speed information to be displayed on a digital display. Time windows are provided which to prevent jitter are syncronized with a rising edge of the square wave signals, and a counter counts the number of trailing edges during a window as an indication of the speed. In a first mode, a running total weighted average of the counts is output to the display with the latest count receiving the most weight to provide a truer output response than with a straight average. If a large change in speed occurs abruptly, the processor automatically changes to a fast update mode wherein the latest count rather than an average is output to the display. Operator switches are provided to select the function to be monitored, but the engine RPM will automatically be displayed on startup. Engine RPM is constantly monitored and a signal is provided to the operator if engine speed drops below a preselected minimum or increases above a preselected maximum. Programming switches are also provided for choosing a proper ground speed window for various tire sizes and also for selecting either km/h or mph readings without need for a trimming potentiometer or internal circuit changes. The processor automatically dims the display by changing the duty cycle of the display drivers when ambient light falls below a preselected level.

These and other objects, advantages and features of the present invention will become apparent to one skilled in the art from a reading of the following detailed description of a preferred embodiment of the invention when taken in conjunction with the accompanying drawings.

DESCRIPTION OF THE PREFERRED EMBODIMENT

Figure 1A:
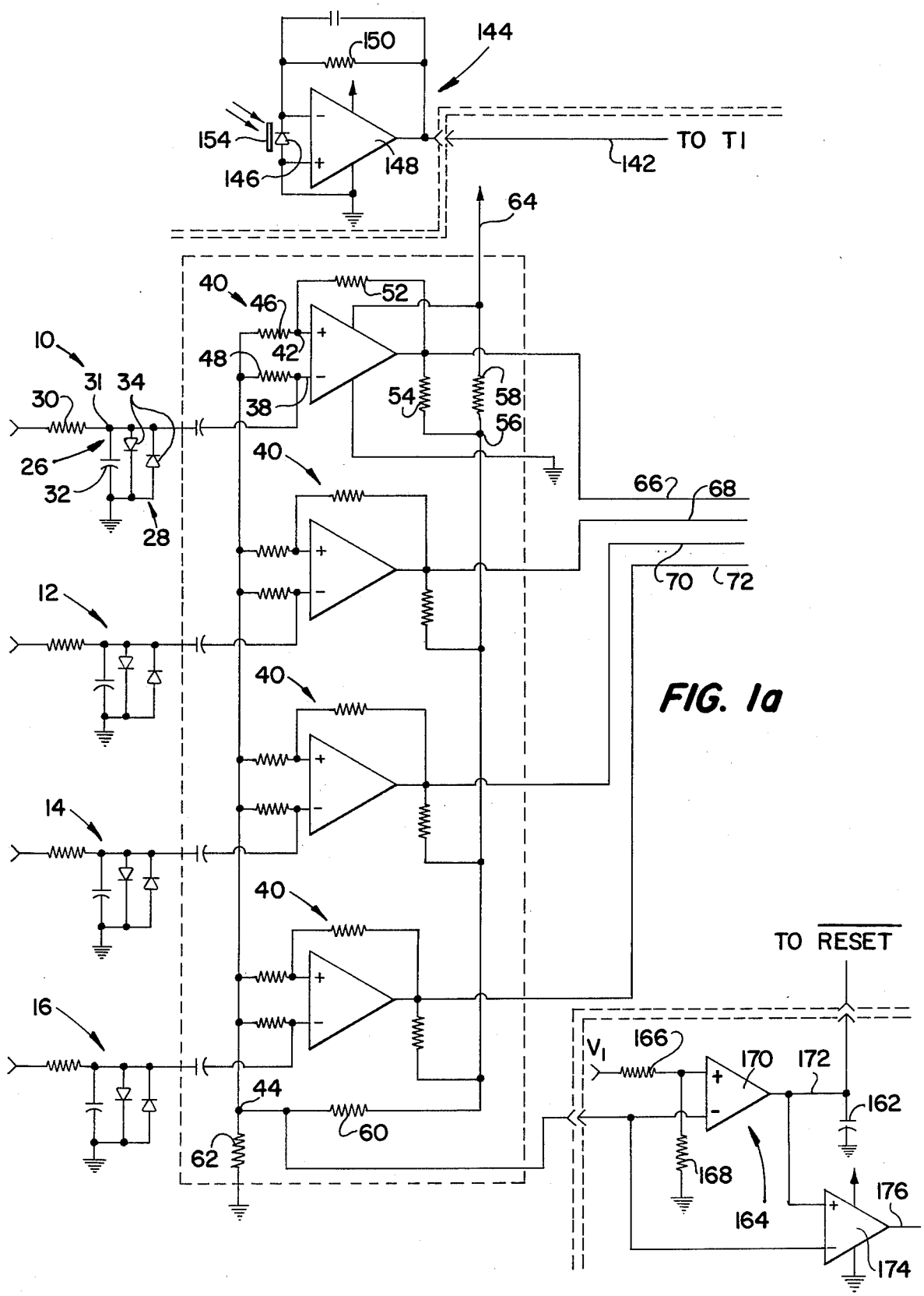
FIGS. 1a, 1b, and 1c together are a detailed schematic diagram of the device of the present invention.
Figure 2:
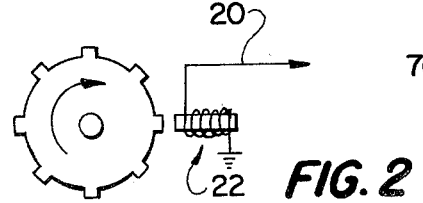
FIG. 2 is a schematical representation of the magnetic transducer for providing an a-c signal having a frequency proportional to speed.

Referring now to FIG. 1a, there are shown input circuits 10, 12, 14 and 16, each connected to an output 20 of a magnetic pickup 22 (FIG. 2) which senses the passage of teeth 24 on a rotating member. The pickup 22 provides a sine wave to the corresponding input circuit having a frequency proportional to the angular velocity of the rotating member. Signals to the input circuits 10, 12, 14 and 16 can correspond, for example, to the engine RPM, cleaning fan speed, header backshaft speed, and ground speed, respectively, on a self-propelled combine.

The input circuits 10–16 are identical, each including a low-pass filter 26 and a limiting circuit 28. The filter has a resistor 30 connected between a pickup output 20 and a terminal 31. A capacitor 32 is connected between the terminal 31 and ground. The value of the resistor and capacitor are chosen to provide a filter cut-off frequency in the middle of the expected signal range for the corresponding magnetic pickup. The limiting circuit 28 includes a pair of diodes 34 connected between the terminal 31 and ground to clip the input at a positive and a negative value of about 0.6 volt. The output from a magnetic pickup increases in amplitude as the angular velocity of the corresponding rotating member increases, but the filter 26 and clipping circuit 28 help to maintain a constant level output at the terminal 32. The filter 26 also eliminates high frequency noise which may be present on the line 20.

A coupling capacitor 36 connects the terminal 31 with an input 38 of a Schmitt trigger 40. The input 38 and a second input 42 to the Schmitt trigger are connected to a reference voltage line 44 by resistors 46 and 48, respectively, and are biased to about a +2 volt level. The output 50 of the Schmitt trigger is connected via a resistor 52 to the input 42 to establish the hysteresis range of the circuit. The output 50 of the Schmitt trigger 40 is connected through a pull-up resistor 54 to a reference voltage line 56 maintained at a potential of about 4 volts. The resistors are chosen so that a positive pulse of about 300 mv. coupled from the terminal 32 to the input 38 causes the output 50 to switch to the low level, while a negative pulse of about 300 mv. is required to cause the output to return to the positive level determined by the reference voltage at 56. By setting the transition points at +300 mv., up to about 600 mv. of noise can be tolerated on the line 20 at the lower frequencies and even higher noise levels at higher frequencies because of the action of the low-pass filter.

The reference voltages at points 44 and 56 are determined by a voltage divider including resistors 58, 60, and 62 connected between a power supply 64 and ground.

Figure 3:
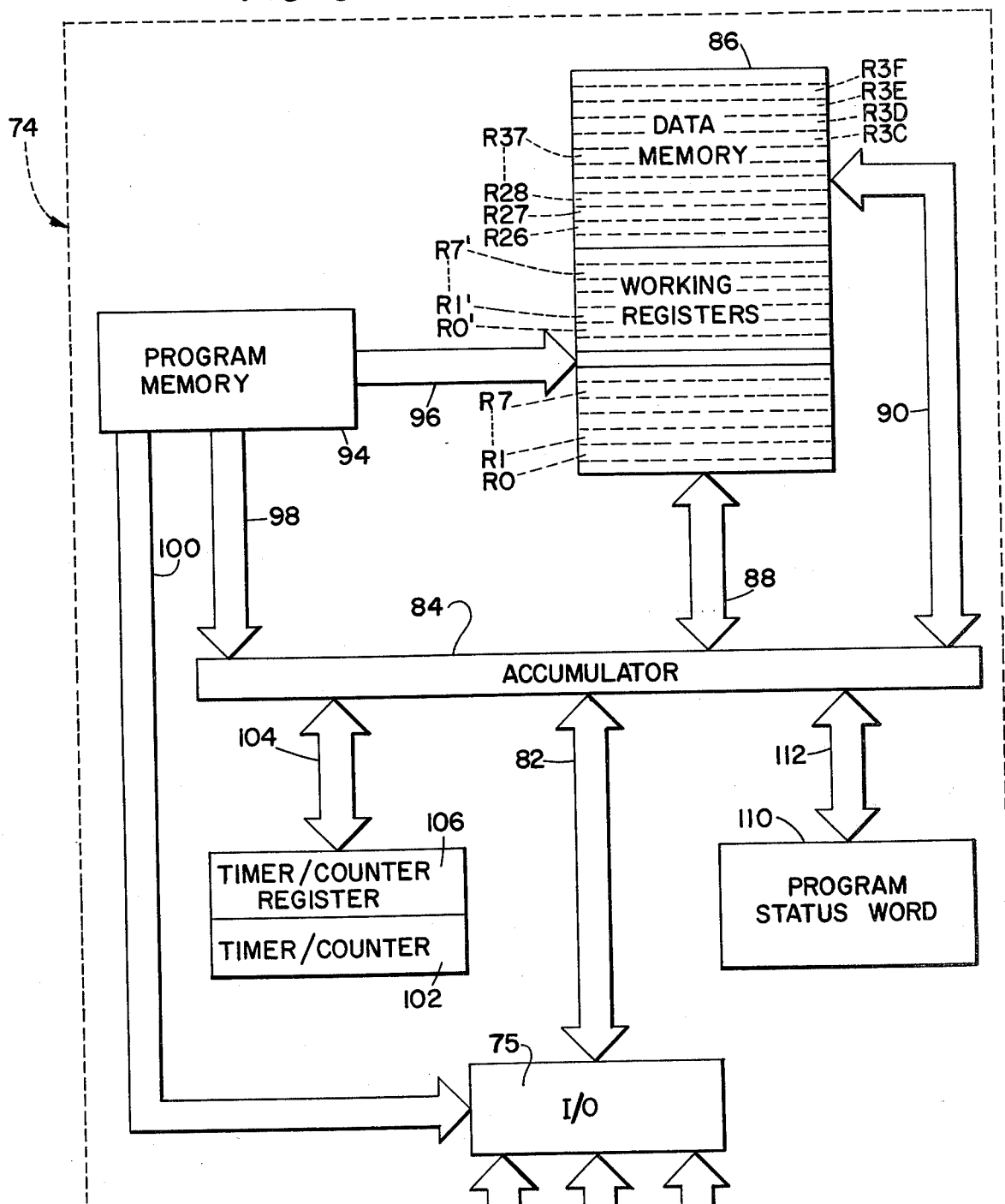
FIG. 3 is a block diagram of the microprocessor shown in FIG. 1b.

The input circuits 10–16 convert the signals from the transducers 22 to constant amplitude square waves at the outputs 50. The outputs 50 are connected by lines 66, 68, 70 and 72 to a microprocessor 74 which in the preferred embodiment is a model 8048 microcomputer available from Intel Corporation of Santa Clara, California. The microprocessor includes an input/output (I/O) device 75 (FIG. 3) with input/output lines grouped in three ports 76, 78 and 80. Data is transferred over bus 82 between the I/O device and an 8-bit accumulator 84, which is the central point for most data transfers within the processor.

A 64 byte random access memory (RAM) 86 is connected by busses 88 and 90 to the accumulator 94. The RAM 86 includes two banks (BANK 0 and BANK 1) of working registers R0–R7 and R0'–R7'. Data can be transferred directly between the accumulator and the working registers over bus 88. The remaining memory is addressed indirectly by an address stored in the R0 and R1 registers. The working registers R0–R7 can also be loaded from a program memory 94 via bus 96. The memory 94, a read only memory which is mask programmable, is connected through bus 98 to the accumulator, and through bus 100 to the I/O device.

Data can be transferred between the accumulator 84 and a timer/counter 102 on a bus 104. The timer/counter includes an 8-bit register 106. In the preferred embodiment, a 6 Mhz crystal oscillator 108 (FIG. 1b) is connected to the XTAL pins of the processor and provides a frequency reference for the timer/counter.

An 8-bit program status word (PSW) 110 can be loaded to and from the accumulator 84 via bus 112. One bit is a working register bank switch bit for determining which of the two banks of R0–R7 registers in the RAM 90 is to be directly addressable by the accumulator. Another bit is a carry bit for indicating that a previous operation has resulted in overflow of the accumulator. The carry bit of the PSW and an 8-bit register R5 are utilized together to provide a 9-bit register for counting the number of pulses occuring during a given clock period, as will be described in detail below. Two flags, F0 and F1, are also provided.

For a detailed description of the construction and operation of the microprocessor 74, see *MCS-48 TM Family of Single Chip Microcomputers User's Manual* available from Intel Corporation.

Figure 1B:
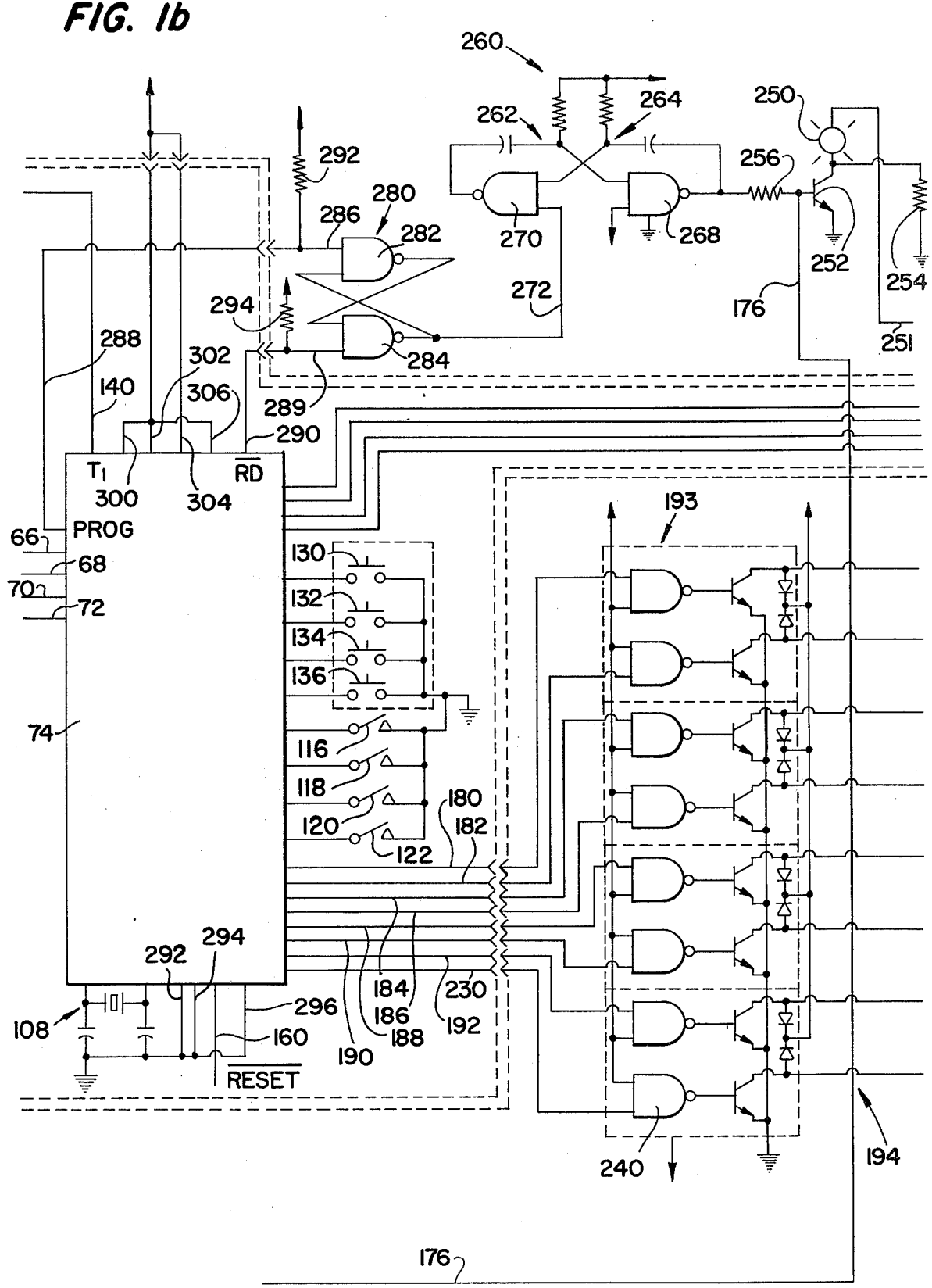

The lines 66–72 are connected to the first port 76 of the microprocessor 74. Connected between the second part 78 and ground are ground-speed programming switches 116–122 (FIG. 1b). Each of the switches 116–120 is either opened or closed according to a chart giving switch position for up to 8 different tire sizes which can be used on the ground wheel drive system on the implement being monitored. The switch 122 is either opened or closed, depending on whether ground speed is to be read in miles per hour or kilometers per hour. The four switches 116–122 thus provide ground speed calibration function. Upon powering up the circuit, a 4-bit word is determined by the switch positions and a window time for the ground speed function is selected corresponding to the word. If a switch is closed, the corresponding line of the port 78 is grounded and the corresponding bit is determined to be a logic "0". If the switch is open, the bit is a logic "1". The program in the memory 94 acts as a map and based on the word read into the accumulator 84 from the programming switches, a window value from a look-up table in the program memory 94 is read into a 2-byte RAM location (R29–R30). The window values are chosen such that each falling edge on the square wave input for the function selected occurring during a window corresponding to 10 RPM or 0.1 mph (or 0.1 km/h).

Also connected to the first port 76 are four normally off momentary switches, including a ground speed switch 130, a header backshaft speed switch 132, a fan speed switch 134 and an engine RPM switch 136 for selecting which of the four input lines 66–72 are to be monitored. The processor constantly reads the switches 130–136 and stores the corresponding function select information in the working registers R7 of the RAM. A logic "1" appears at each of the four lines from the switches 130-136 unless a switch is depressed to ground a line and produce a logic "0". If two switches are depressed at the same time, the display 152 will be blanked.

Also connected to an input 140 (T1) of the microprocessor 74 is an output line 142 (FIG. 1a) from a light detector circuit 144. This circuit 144 includes a photodiode 146 connected between the positive and negative inputs of an operational amplifier 148. The positive input is grounded, and feedback is provided between the output line 142 and the negative input via a resistor 150. When light above a preselected threshold impinges on the diode 146, current flows from the negative to the positive terminal causing the output on line 142 to go to the high or logic "1" level to supply current through the resistor 150 to the negative input. If the light decreases below the threshold, the output goes to the low or logic "1" level. Preferably, the threshold is selected so that the output goes low so the T1 input 140 sees a logic "0" at the level of light present at dusk at the operator's station. The processor continuously multiplexes a 4-digit incandescent display 152, operating each digit at a conventional 25% duty cycle when T1 is at the high level and alternately at a 10% duty cycle when T1 is at the low level. The reduction to a 10% duty cycle is accomplished by checking the level at pin T1 each time a digit is illustrated and automatically turning off the digit 40% of the way through its conventional illumination time if T1 is low. This feature, described in further detail below, dims the display at night so it is easier to read. A green filter 154 is placed over the diode 146 which preferably is located near the 4-digit display, to prevent infrared light from the display from activating the diode at night, for example, as the operator moves his hand near the display.

Terminal 160 (RESET) of the microprocessor 74 is connected to a capacitor 162 to assure that all circuitry is reset by an internal reset pulse when power is turned on. A reset circuit 164 is also connected to the terminal 160. A voltage divider including resistors 166 and 168 is connected between a first voltage supply V1 (11.6 volts) and ground. The positive input of an operational amplifier 170 is connected between the resistors, and the negative input is connected to the reference voltage terminal 44 of the input circuits. Normally, the voltage at the positive input of the amplifier 170 is higher than at the negative input so the output 172 remains high. If the voltage supply level should drop, the output 172 goes low, causing the processor circuitry to reset preventing false indications resulting from the voltage drop. A second operational amplifier 174 has its positive input connected to the output 172 and its negative input connected to the terminal 44 so that when the output at 172 is low (for example, when the power is first turned on to the microprocessor), the output on a line 176 from the amplifier will be low. When the voltage at 172 exceeds the voltage at the terminal 44, the voltage on line 176 goes high.

Seven lines 180-192, are connected between the bus port 80 and a segment enable circuit 193 of standard 7-segment control logic 194 for the 4-digit display 152. Four 8-bit display registers R3C-R3F in the RAM 86 corresponding to four display digits 200-206 are each loaded with the 7-segment code for the desired readout. A conventional multiplexing method is used, with each of the four individual display registers being output approximately 25% of the time when the ambient light level is high. Display drivers 208-214 each include a Darlington pair input circuit 216 connected to the second port 78 by one of four lines 218C-218F and to a drive transistor 220 for supplying current in turn to the appropriate display digit during the time the corresponding display register is being output. If the voltage on terminal T1 (input 140) is high, the line 218 for a particular digit remains high during the entire 25% of the time the display register for that digit is being output. If the voltage on T1 is low, the time that the line remains high is decreased to 10% so that each digit is dimmed. The working register R2 in the RAM carries a 4-bit word consisting of one logic "1" and three logic "0"s which are rotated as the program in the memory is advanced providing a logic "1" on the appropriate line 218. The register R0 points to the particular register in the RAM where the 7-segment code is located for each digit selected. There are the four registers, R3C-R3F, corresponding to the four lines 218C-218F.

Only 7 bits of each of the 4 display registers R3C-R3F in the RAM are required to produce the desired digit from each 7-segment lamp, and the most significant bit (MSB) is used to illuminate one of four lamps 232-238 which indicate the selected function, engine RPM, fan speed, header backshaft speed and ground speed, respectively. The 8th bit of each display register is therefore a function select bit for the display. For example, if the operator pushes the header backshaft switch 132, a logic "0" is provided in the MSB in the third display register R3D while logic "1"s are present in the MSB in the other display registers. As the first two display registers R3F and R3E are output to the display logic 194, lamps 232 and 234 remain dark since the high level on line 230 during this portion of the cycle causes NAND circuit 240 to remain off. When the third display register R3D is read in turn to control the segments of the digit 204, the low level at the MSB of that register causes the NAND gate circuit 240 to switch on, allowing current from the driver circuit 212 to illuminate the header backshaft indicator lamp 236. Because the ground speed function requires a decimal point between the digits 202 and 204, a decimal point lamp 242 is provided and is connected in parallel with the ground speed lamp 238.

An engine speed warning light or monitor 250 (FIG. 1b) is connected between the collector of an NPN transistor 252 and the output 251 of the driver 208. The collector is also connected to ground through a resistor 254 to establish a small idle current through the light 250 when the transistor 252 is biased to the off condition. The base of the transistor is connected through an input resistor 256 to a selectively activatable oscillator 260 having a low frequency of oscillation. The time constant of RC circuits 262 and 264 connected to NAND gates 268 and 270 is about one second. The base is also connected to the line 176 which prevents the transistor 252 from turning on until the supply voltage has reached a predetermined level and the microprocessor 74 has been initialized by the RESET. The control input 272 of the oscillator 260 is connected to the output of a reset flip-flop 280 which includes NAND gates 282 and 284. An input 286 of the gate 282 is connected to the program pin (PROG) 288 of the microprocessor, and an input 289 of the gate 284 is connected to the read pin (RD) 290. The inputs 286 and 289 are connected through pullup resistors 292 and 294 to a positive 5-volt supply.

Figure 1C:
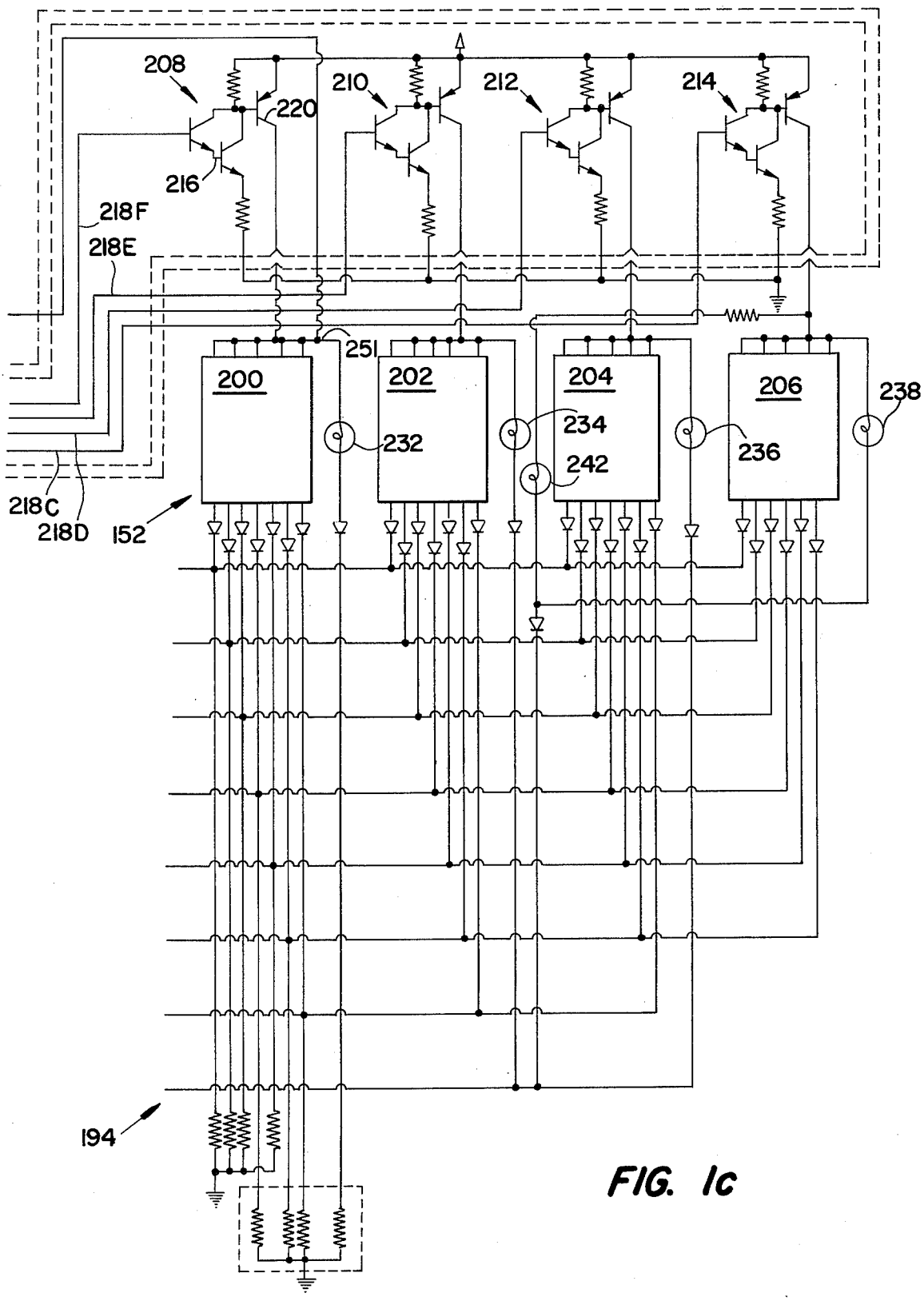

A pulse from pin 288 (PROG) which drops the voltage at input 286 to ground causes the output 272 of the flip-flop 280 to go low, diabling the oscillator 260 by holding the output of the NAND gate 270 at the high level. A negative pulse from the pin 290 resets the flip-flop so that the output 272 is high, enabling the oscillator 260. The output of the NAND gate 268 is at ground level and the transistor 252 is biased off except when the oscillator 260 is enabled at which time the lamp 250 will flash at the oscillator frequency. The duty cycle of lamp 250 while the base of the transistor 252 is biased above the base-emitter turn-on voltage is the same as the duty for the digit 200 (FIG. 1c) since the lamp is connected to the output 251 of the driver 208. This assures that the lamp 250 will be dimmed with the rest of the display 152 at night. In the preferred embodiment, the processor 74 constantly monitors the engine speed as well as the function selected by the switches 130–136 and outputs a pulse on the RD pin 290 to start the oscillator and cause the tolerance indicator 250 to flash if engine speed rises above 2400 RPM or drops below 2180 RPM.

Pins 292, 294 and 296 (EA, $V_{ss}$ and T0) of the microprocessor are grounded. Pins 300–306 ($\overline{ss}$, $\overline{INT}$, $V_{cc}$ and $V_{dd}$) are connected to the positive 5-volt supply.

The data memory of the RAM 86 includes an average value ($A_n$) register R32-R33, an immediate value ($X_n$) register R34-R35, and a four times average value ($T_n$) register R36-R37. Also included is a time-out register R27-R28 utilized to insure that, when there are no pulses coming in, the program will not remain in the "START" routine 500 (FIG. 4b, described below) indefinitely. The function of the registers will become apparent from the description of operation of the microprocessor 74 in conjunction with the flowchart of FIG. 4a–4h.

During each window the microprocessor 74 determines the number of pulses occurring on one of the lines 66–72 corresponding to the function selected by counting the number of falling edges. A weighted average of the counts obtained during successive windows is provided. In the preferred embodiment, the average $A_n$ is computed according to the following equation:

$$A_n = \tfrac{1}{4}[X_n + \tfrac{3}{4}X_{n-1} + (\tfrac{3}{4})^2 X_{n-2} + (\tfrac{3}{4})^3 X_{n-3} + \ldots] \quad \text{(Eqn. 1)}$$

where $X_n$ is the immediate value of the pulse count taken during the nth window. The latest count $X_n$ receives the most weight. Normally the average value $A_n$ stored in the average value register R32-R$\times$ is converted to 7-segment code which is stored in the four display registers R3C-R3F and utilized to update the display 152. However, the immediate value $X_n$ is first compared with the previous average $A_{n-1}$ and, if $X_n$ is significantly different than $A_{n-1}$, indicating rapid acceleration or deceleration, the immediate value $X_n$ rather than the new average is utilized to update the display 152. In the preferred embodiment, if the immediate count $X_n$ differs from the last average $A_{n-1}$ by four or more counts (i.e., 40 or more RPM), the program calls for updating the display 152 with the immediate value $X_n$. The program will remain in the immediate update mode for six immediate updates before returning to the averaging mode. This feature allows the operator to guickly adjust the selected function speed to the desired value without delay and overshoot, while at the same time providing a very accurate, non-jittering display at relatively steady operating speeds.

Referring to the flow chart (FIG. 4a), the operation of the tachometer is as follows. The power is turned on to the circuit, and the $\overline{RESET}$ function described above initiallizes the processor 74. A "RESET" routine 400 is begun, and the display 152 is blanked (step 401) by assuring the four driver input lines 218 are low. The average value ($A_n$) register R32-R33 and the timer/counter register 106 are cleared. A pulse output on the PROG pin 288 (step 404) to assure that the oscillator 260 is disabled so the warning lamp 250 does not flash. The output register pointer R0 and the digit select register R2 in the first bank (BANK 0) of the RAM, are initialized at 405 so that the bit corresponding to the most significant digit 200 is a "1". The register R2 selects which one of the digits 200–206 is to be activated by determining which one of the lines 218 to the digit drivers will be high. The register R0 points to one of four registers R3C-R3F in the RAM 86 containing the 7-segment code for that particular digit. Then at step 406 the register R7, which stores a code that corresponds to the desired function selected by the switches 130–136, is loaded with the code corresponding to the engine speed function which is displayed initially. When a different function switch is depressed, a new code will be entered into R7.

During the "RESET" routine a "0" is entered to the flag bit F1 at step 407 signifying that the microprocessor program has not been interrupted from an "UPDATE" routine 600 (FIG. 4d) which is used to calculate the value to be displayed. The four display registers R3C-R3F are loaded with ones (408) so the segment enable circuit 193 turns off all 7 segments of the digits. The MSB in one of the display registers R3C-R3F corresponding to the function selected (i.e., the engine RPM on the digit 200) is blanked so that the NAND gate 240 is turned on to illuminate the lamp 232 during the portion of the cycle the line 218F is high, which is determined by the location of the "1" in R2.

During step 409, the four programming switches 116–122 are read and a proper time window is selected from the program memory 94 on the basis of the switch positions. The window is chosen such that each pulse counted during the window corresponds to 0.1 mph (10 RPM when shaft speeds are measured). The window value is loaded into the window register R29-R30 of the RAM 86 during step 410. (Register designations are in a hexidecimal rather than a decimal based system.) The window value actually determines the number of times the processor will run through the "START" routine (FIG. 4b) which is a predetermined number of instruction cycles (66) no matter which path is taken through the routine and therefore is a well-defined time, subject only to inaccuracies in the crystal oscillator 108.

The 9-bit counter register consisting of the register R5 and the carry bit is cleared at step 411 so it is ready to be incremented each time a falling edge occurs on the selected input during a window. The time-out register R27-R28, which counts the number of times the program runs through the "START" routine without occurrence of a rising edge on one of the input lines 66–72 selected, is cleared.

A working register R6 is loaded with "1"s. During operation the register R6 stores a "1" or a "0" depending on whether the selected input was high or low during the last sample. A change from a "1" to a "0" indicates a falling edge occurred on the input, while a change from a "0" to a "1"indicates occurrence of a rising edge. Since the window is started on a rising edge of the square wave from the input circuit, loading R6 with "1"s assures that a falling edge and a rising edge occur before the window is begun after the "RESET" routine 400.

The flag F0 is cleared during the "RESET" routine to signify that a window has not started. When the rising edge is detected and the window is begun during the "START" routine 500, a "1" is stored in F0.

Working registers R3 and R4 together form a 2-byte window register which is loaded with a value corresponding to the function selected (i.e., engine RPM) which determines the number of cycles through the "START" routine during a window, thereby establishing the time of a window.

The "START" routine 500 (FIG. 4b) has two functions. The first is the timer/counter interrupt handler. When program operation is in the "UPDATE" routine 600 (FIG. 4d) wherein the data is prepared for readout to the display 152, program flow is interrupted periodically by the timer/counter 102 in order to continuously multiplex the display and examine the function select switches 130-136. The second function of the "START" routine (when entered as a normal routine) is to set up a window time corresponding to the function selected and then count the number of falling edges within this window.

At step 501 the value in the accumulator 84 is stored in a working register R2' in the second bank (BANK 1) so that if the program was interrupted from the "UPDATE" routine (600) to examine the switches 130—130 and multiplex the display 152, the accumulator value would be saved for when the program returns to the "UPDATE" routine to finish the calculation or the like in progress at the time of the interrupt.

The digit select register R2 is then output at step 502 to the lines 218C-218F so that the line with the logic "1" level turns on the appropriate one of the digit drivers 208-214. At the same time, the pointer register R0 causes the corresponding one of the four display registers R3C-R3F to output the 7-segment code for that digit.

At step 503 the timer/counter register 106 (FIG. 3) is set to a preselected value so that after the program is in the "UPDATE" routine 600 the timer/counter 102 causes the program to return to the "START" routine periodically. In other words, the setting of the timer/counter assures that scanning of the function select switches and display occur regularly.

After one of the digits 200-206 (FIG. 1c) is refreshed, the contents of the registers R0 and R2 are adjusted (504) so that the next time through the "START" routine the next digit on the display 152 will be refreshed. This is accomplished by simply rotating the contents of the registers one location. Therefore, "1" will appear on the next line 218 and "0"s on the other three lines so the next digit driver for the display 152 will be activated, and the next display register will output the proper 7-segment code for that digit to the circuit 193.

The input function select switches 130-136 are scanned each time through the "START" loop at step 505, and if a new function has been selected (506), the timer/counter interrupt function is disabled (508), a "0" is placed in the flag F1 and the display 152 is blanked. This assures that the information in "UPDATE" relating to the previous function selected will not be displayed. The working register R7 then receives a new code from the memory 94 corresponding to the function selected at step 509. If two or more of the switches 130-136 are depressed, the indicators 232-238 will remain off. This is accomplished by choosing the initial digit (step 510) on the basis of the function selected, and when two functions are selected, no initial digit can be determined. The display registers R3C-R3F are loaded with ones (511) so all segments will be blank initially. The MSB is then cleared in the display register corresponding to the function selected to cause the proper one of the indicators 232-238 to be activated. The engine speed monitor 250 is turned off at step 512 by disabling the oscillator 260 with a pulse from the PROG pin 288 (FIG. 1b). An immediate response is provided when a new function is selected, and a correct value is quickly shown on the display, eliminating problems of false readings common with prior art devices when the function is changed.

The block in the flow chart indicated at step 513 assures that if the program was interrupted during the "UPDATE" routine and a new function was selected by the operator, the program will not return to "UPDATE" during a RETURN instruction but will instead go to the "START" routine address jammed onto a stack location of the RAM 86. Only the RETURN instruction (RETR) can reset an interrupt request flip-flop in the microprocessor 74 so that the program does not return to the "UPDATE" routine. The instructions are fully described in the aforementioned User's Manual. When a new function has been selected, all the registers are initialized (514) in a similar manner as that described above for the "RESET" routine 400, and the "START" routine is begun.

If during the next pass through the "START" loop (FIG. 4b) no new function is indicated at step 506, the pin 140. (T1) is checked (step 515). If T1 is "0", indicating low ambient light level at the photodiode 146 (FIG. 1a), the display 152 is dimmed by reducing the duty cycle of each of the drivers 208-214 from 25% to 10%. The pin T1 is checked at a point in time approximately 40% through the instruction cycles of the "START" loop. If T1 is "0", the driver for the digit being refreshed during the loop is turned off during the remaining 60% of the instruction cycles. If T1 is "1", the digit driver remains on for the entire time it takes to complete the loop, which in the preferred embodiment is 165.0 microseconds (2.5 microseconds per instruction).

Figure 4A:
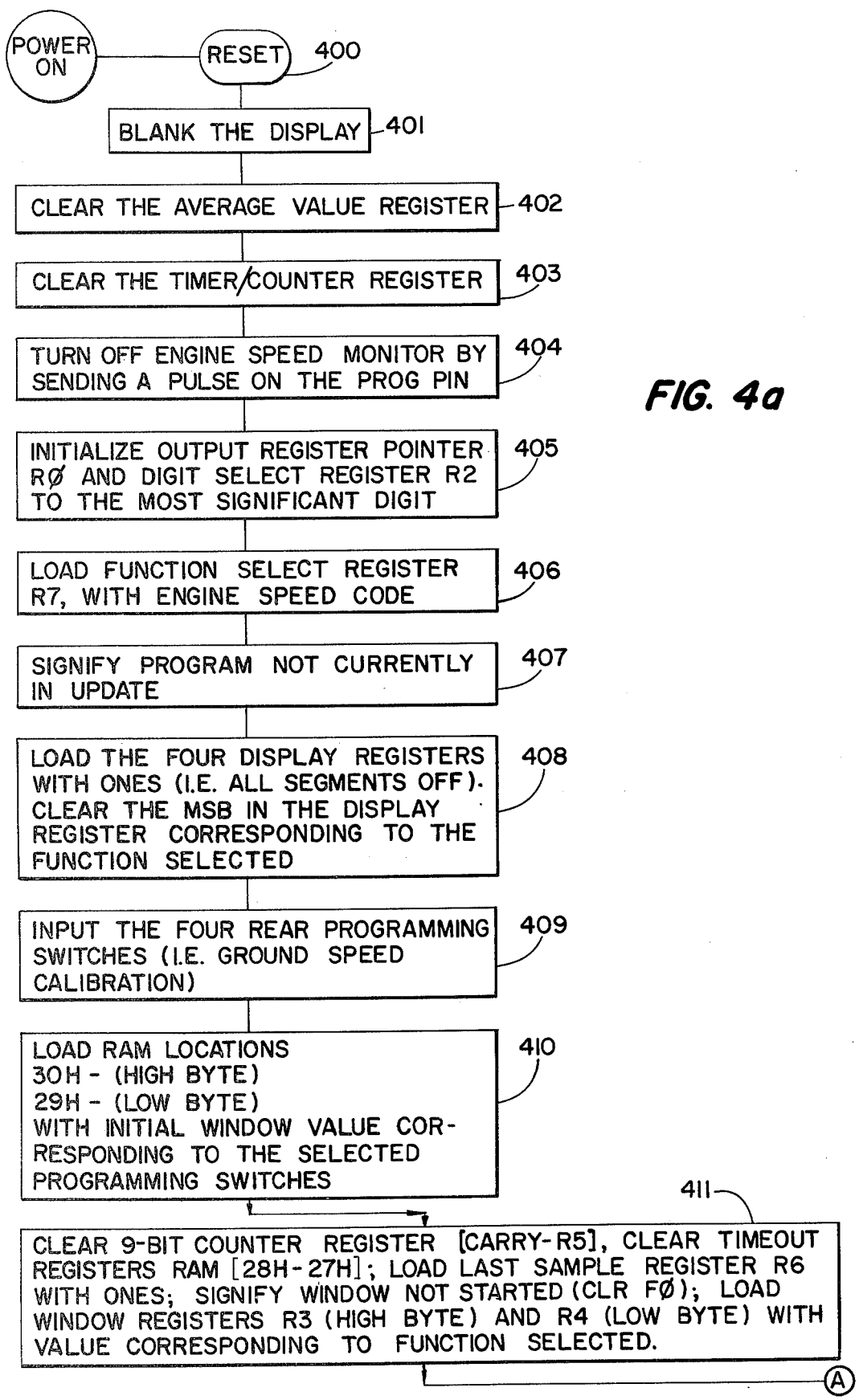
FIGS. 4a–4h together are a detailed flowchart for the microprocessor of FIG. 3.
Figure 4B:
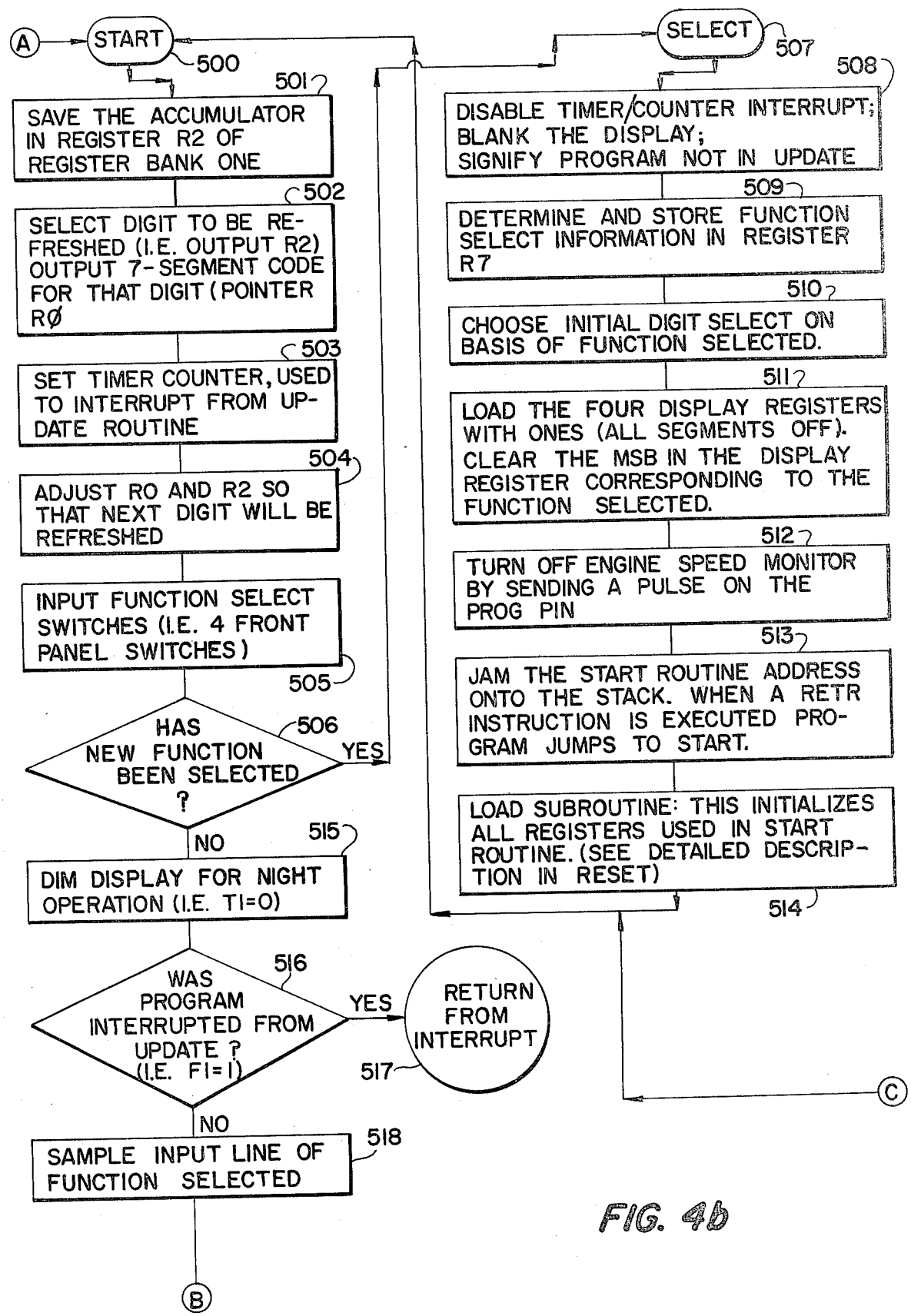
Figure 4C:
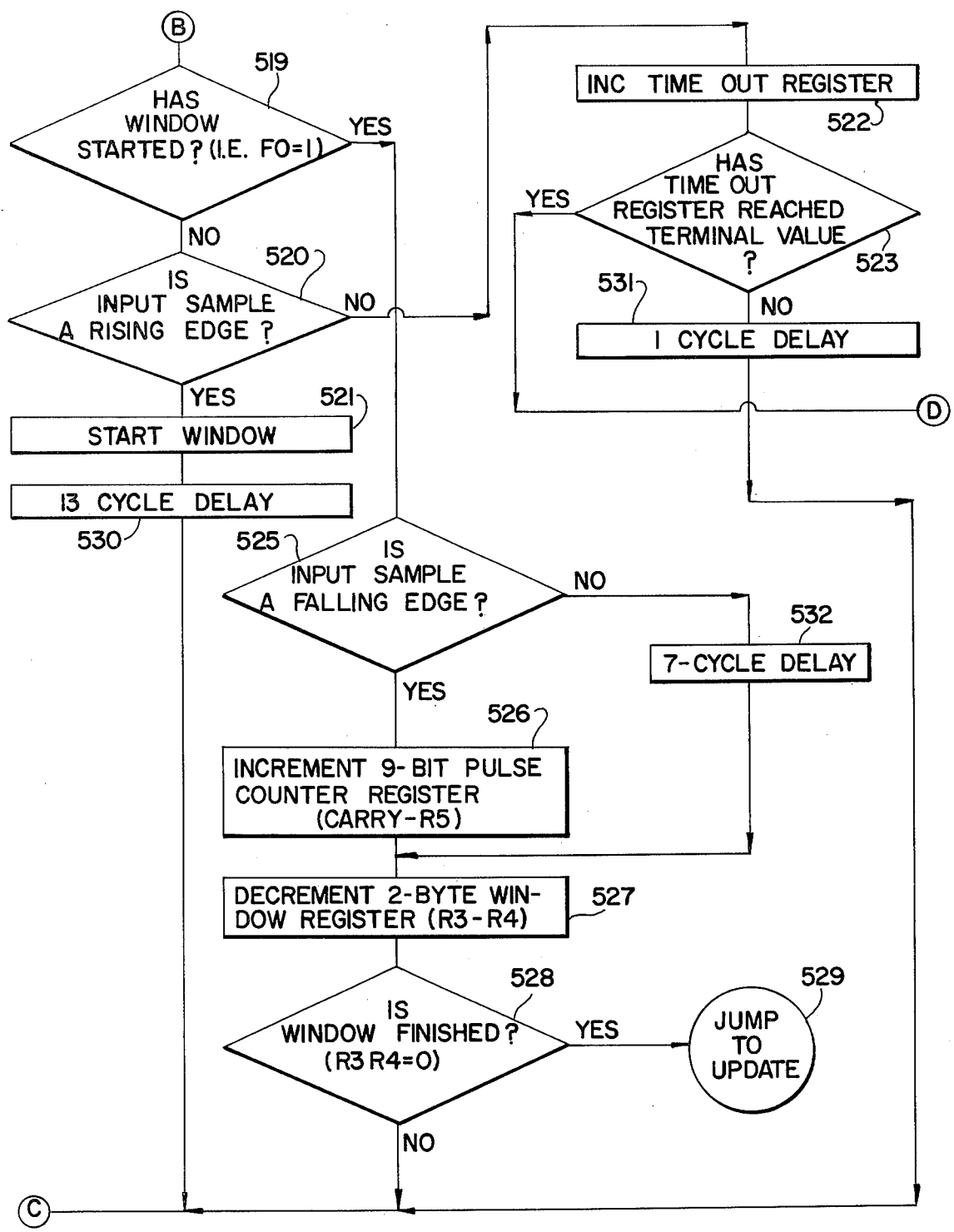
Figure 4D:
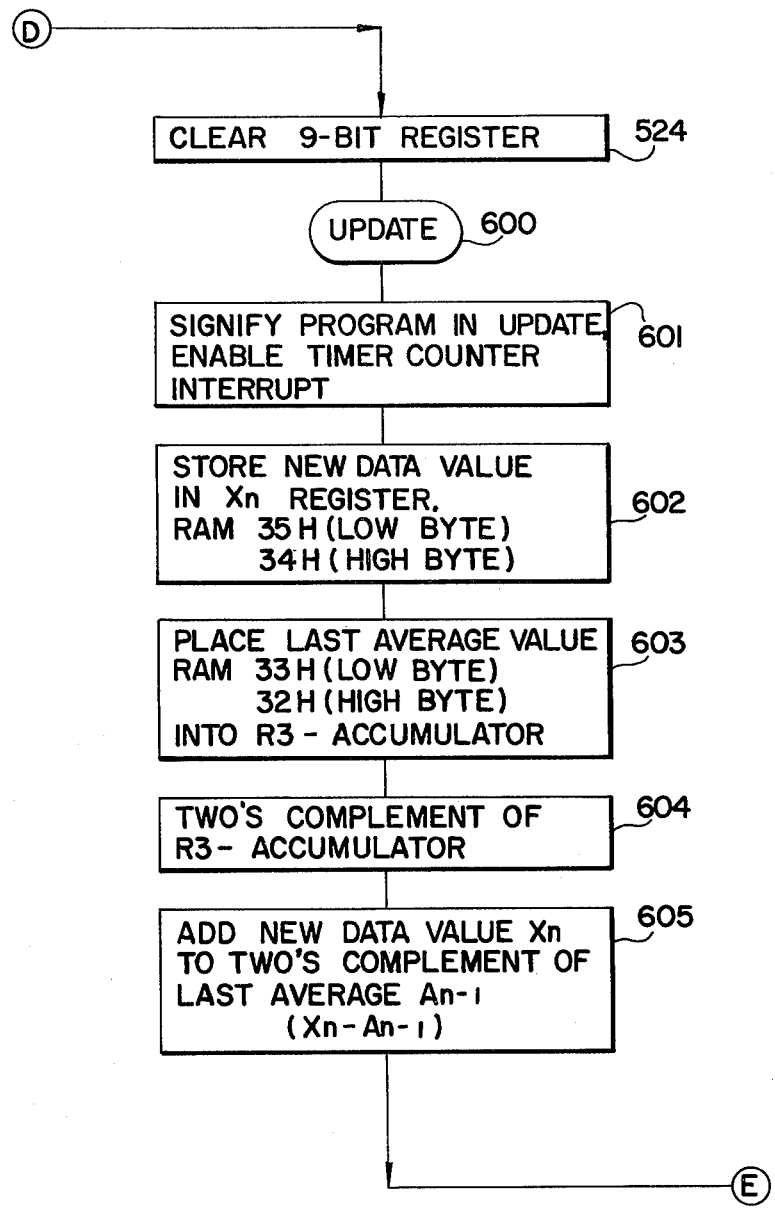
Figure 4E:
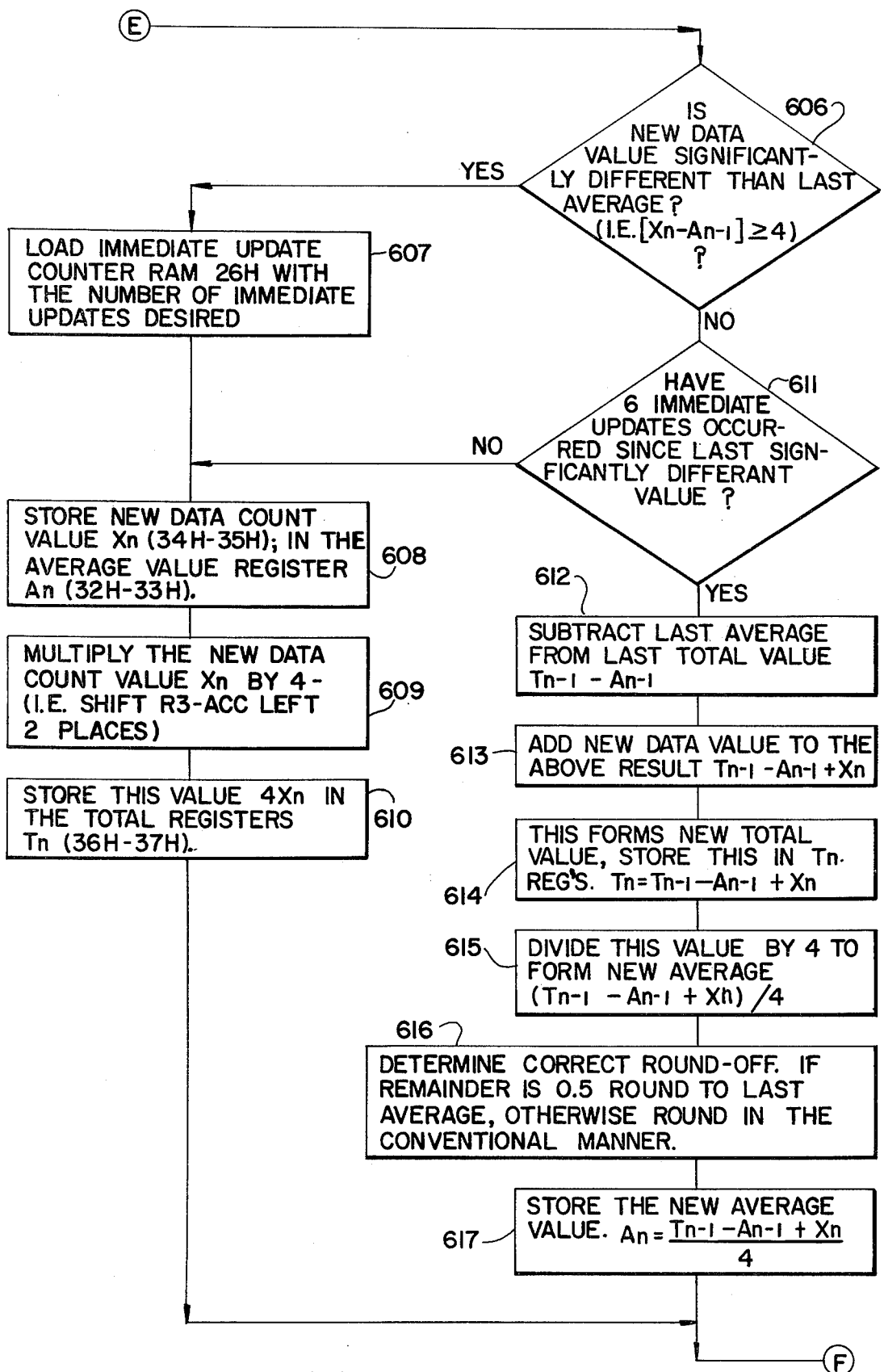
Figure 4F:
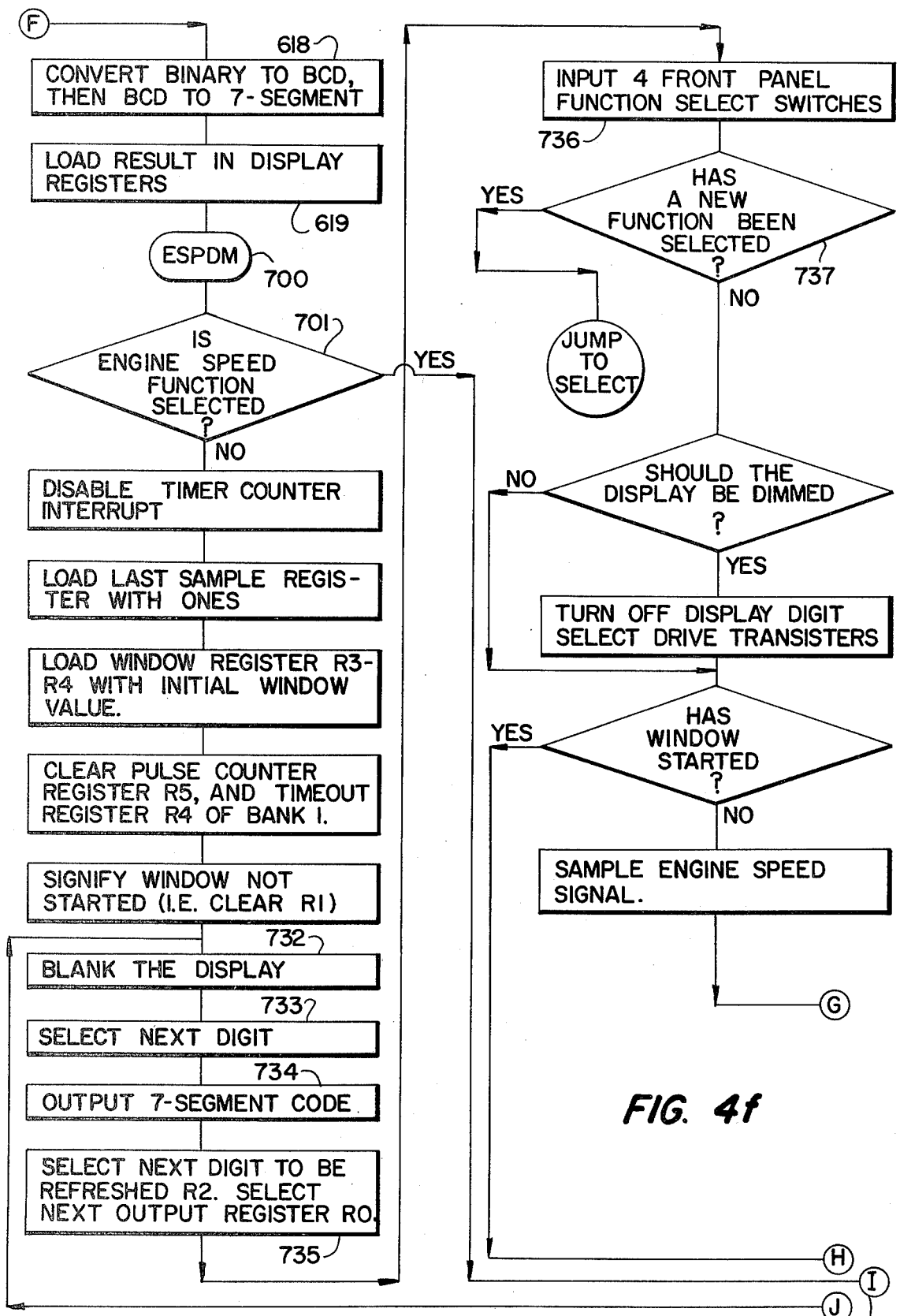
Figure 4G:
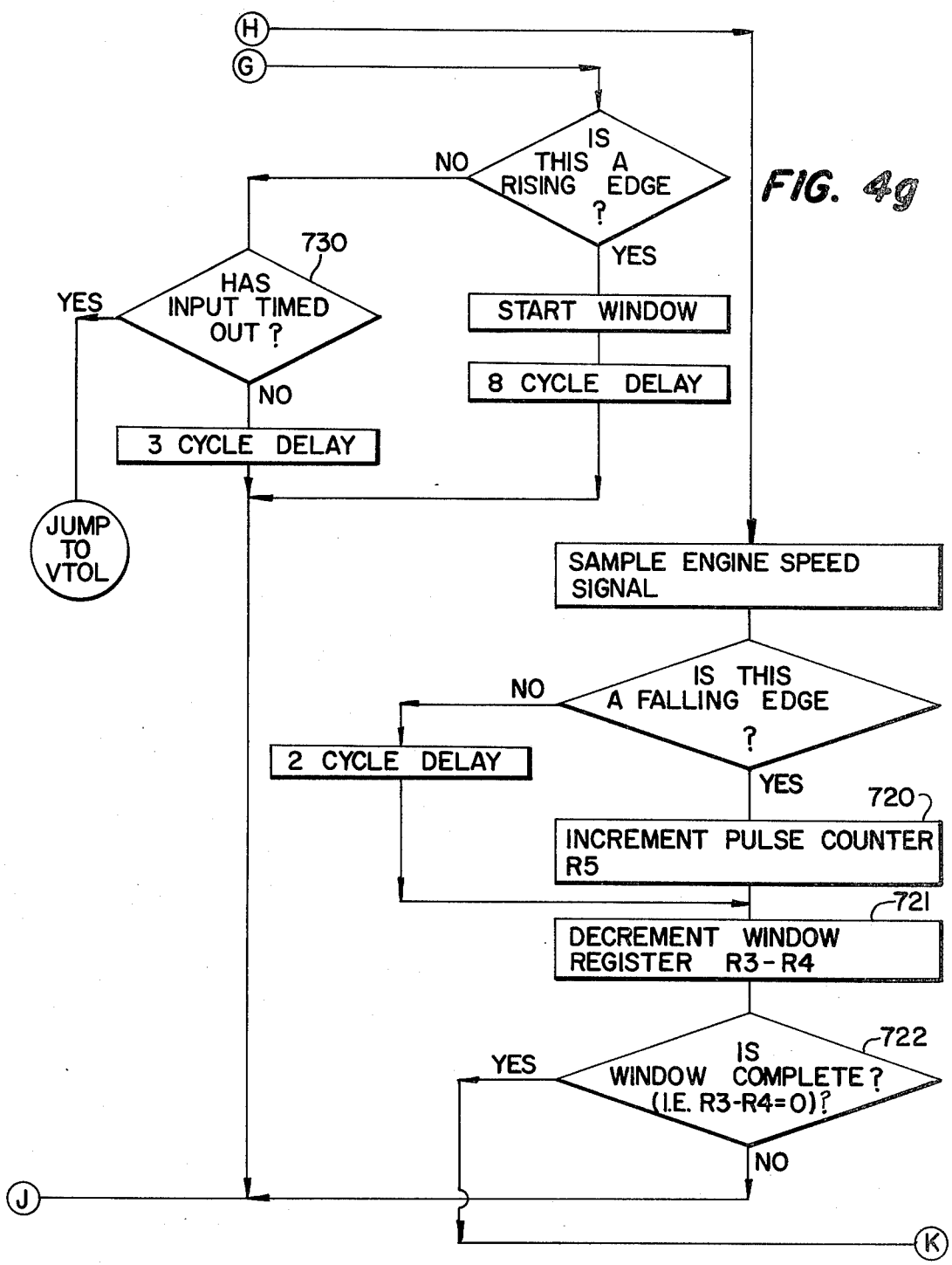

If the program was interrupted by the timer/counter while in the "UPDATE" routine 600, indicated by a "1" in the F1 flag checked at step 516, the program will return to finish the "UPDATE" routine 600 (517). If the F1 flag contains a "0", the "START" loop continues with the square wave from one of the lines 66-72 corresponding to the function selected being sampled at step 518. Next, the F0 flag is checked to see if a window has begun in a previous pass through the "START" loop (step 519, FIG. 4c). If F1 is a "0" indicating the window has not yet started, the register R6 is checked at step 520 to see if the input sampled a rising edge (i.e., a transistion from a "0" to a "1" in the R6 register). If there is a rising edge, the window is begun (521) and a "1" is stored in the F0 flag. If no rising edge is detected, the time out register R27-R28 is incremented (522) and, if after a preselected number of passes through the "START" routine no rising edge is detected (523), the 9-bit count register (R5+the carry bit) is cleared at step 524 (FIG. 4d). In other words, if no rising edge is detected after a preselected time, the processor assumes that nothing is happening at the input line selected and clears the 9-bit falling edge counting register so that a zero value is supplied to the immediate value ($X_n$) register R34–R35 during the "UPDATE routine 600. When a rising edge is detected at 520 and the window is begun (521), the program makes a number of passes through the "START" loop, each time incrementing the 9-bit register at step 526 if a falling edge is detected on the square wave input. Each time through the loop the 2-byte window register R3–R4 is decremented at step 527 until the window is finished at 528 (R3–R4=0), at which time the program jumps (529) to the "UPDATE" routine 600.

Delays 530, 531 and 532 are provided in the various paths in the "START" routine 500 so that regardless of the path taken, the number of instruction cycles, and therefore the time elapsed, will be the same for each pass through the loop. In the preferred embodiment there are 66 instruction cycles in the "START" loop, and one pass takes 165.0 microseconds. Timing the windows by counting the number of times through the "START" loop is more accurate than, for example, performing a timer interrupt since it is possible to interrupt on either a one- or a two-cycle instruction, providing a one-cycle time uncertainty as to the actual length of the window. Syncronizing the start of a window with a rising edge of the square wave and counting falling edges eliminates the jitter in the least significant digit of the display 152 that would occur if a window was begun at random.

The "UPDATE" routine 600 (FIG. 4d–4f) is entered from the "START" routine with a new speed value ($X_n$) which is compared with the last average speed value ($A_{n-1}$). If $|X_n - A_{n-1}| \leq 4$, corresponding to a change of at least 40 RPM, the new value is stored in the average value ($A_n$) register R32–R33. If $|X_n - A_{n-1}| < 4$, the new average is calculated according to equation 1 above and is converted from binary to binary coded decimal, and then to 7-segment code which is stored in the display registers R3C–R3F read during the "START" routine 500.

Once in the "UPDATE" routine 600, the flag F1 is loaded with a "1" which indicates return to the routine 600 from step 516 of the "START" routine is necessary after a timer/counter interrupt. The timer/counter interrupt is enabled at step 601 so that the function switches 130–136 will be scanned and the display multiplexed regularly. At step 602 the new data value $X_n$, which is the binary representation of the number of falling edges counted during a window in the 9-bit register, is stored in the new data value register R34–R35. A two's compliment of the binary value of the last average value $A_n - 1$ is taken and added to the value $X_n$ (steps 603–605), which is equivalent to subtracting $A_{n-1}$ from $X_n$. If the absolute value of the difference between the new data value $X_n$ and the last average value is 4 or more (606), an immediate update counter in the RAM, R26 is loaded at step 607 with the number of immediate updates desired, which in the preferred embodiment is six. That is, once the difference exceeds the preselected value indicating a sudden increase or decrease in speed, the processor will perform six immediate updates in which the new data value $X_n$ is entered directly into the average value ($A_n$) register R32–R33 at step 608 without averaging in the previous counts. $T_n$ value is calculated and stored at steps 609–610. After the sixth immediate update after the sudden change occurred (611), an average $A_n$ is again computed and stored in register R32–R33 at steps 612–617.

When the "UPDATE" routine is not in an immediate update mode, a weighted average according to eqn. 1 is computed by first subtracting the previous average value $A_{n-1}$ in the register R32–R33 from the value in the four times average value ($T_n$) register R36–R37 at step 612:

$$(T_{n-1}) - (A_{n-1}) = 3(A_{n-1}) \qquad \text{Eqn. 2}$$

The new data value $X_n$ is added and the result is stored in the $T_n$ register at steps 613 and 614:

$$T_n = (T_n - 1) - (A_n - 1) + X_n = 3(A_n - 1) + X_n \qquad \text{Eqn. 3}$$

The $T_n$ value is then divided by four, rounded off and stored in the average value ($A_n$) register R32–R33 at steps 615–617:

$$A_n = \tfrac{1}{4}[X_n + 3(A_n - 1)] \qquad \text{Eqn. 4}$$

Since $A_n - 1 = \tfrac{1}{4}[X_{n-1} + 3(A_{n-2})]$:

$$\begin{aligned} A_n &= \tfrac{1}{4}[X_n + \tfrac{3}{4}[X_{n-1} + 3(A_{n-2})]] \\ &= \tfrac{1}{4}[X_n + \tfrac{3}{4}(X_{n-1}) + 3^2/4\,(A_{n-2})] \end{aligned} \qquad \text{(Eqn. 5)}$$

Carrying this out for n samples or windows, Equation 1 is obtained. The new data value $X_n$ is averaged with the previous values, but the weight given each previous sample is less than that given a subsequent sample. More than just a few of the past data values are used in the calculation, yielding a smoothly changing, easily readable display, while weighting the latest pulse count $X_n$ the heaviest provides a more accurate representation of speed.

After the value $A_n$ is determined at step 608 or 617, it is converted to a 7-segment code at step 618 (FIG. 4f) using a standard routine well known to those skilled in the art and stored in the display registers R3C–R3F.

Figure 4H:
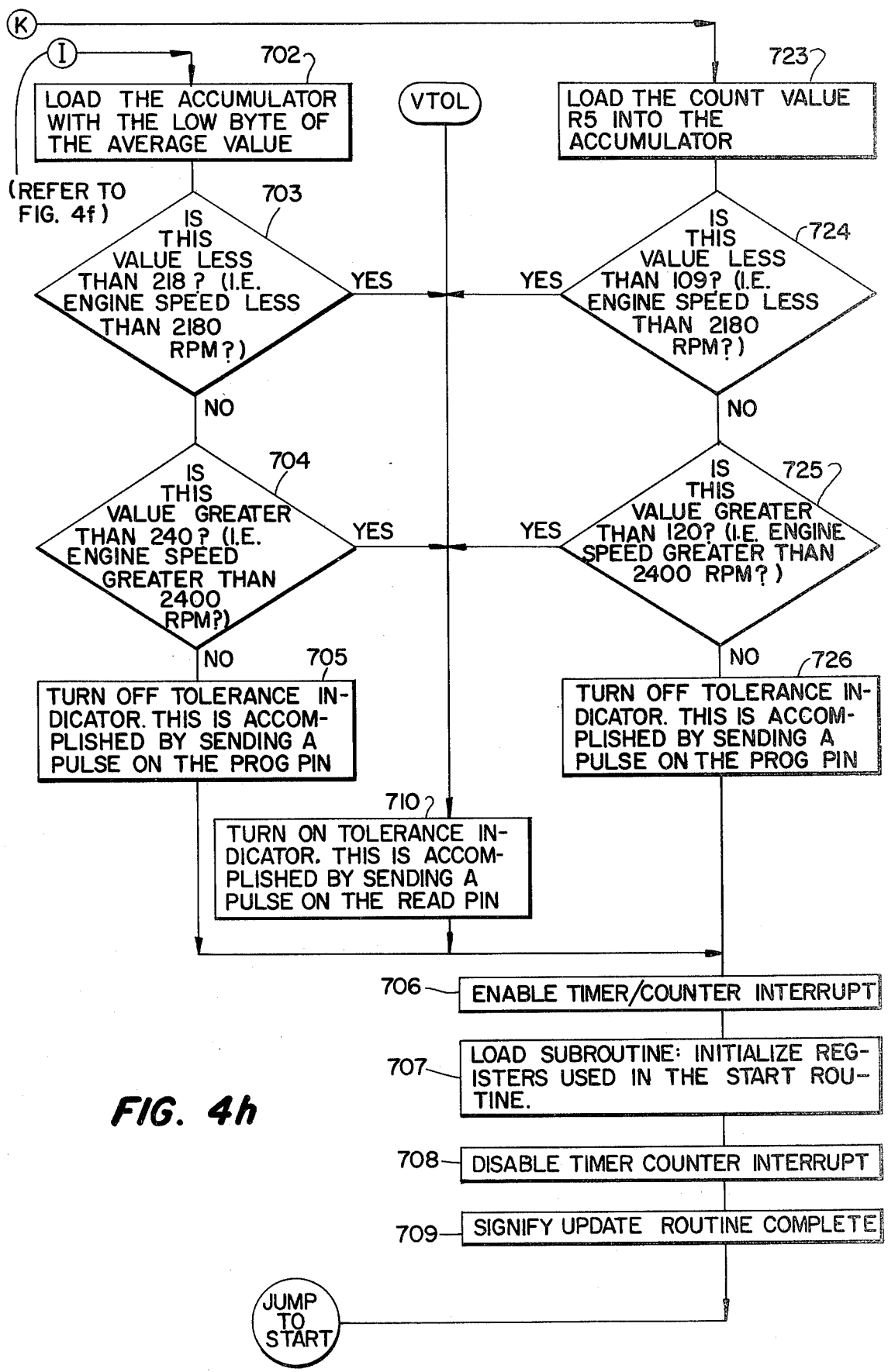

After the "UPDATE" routine 600 is complete, an engine speed monitor rountine 700, ESPDM (FIG. 4f–h), is initiated to activate the engine speed warning lamp 250 (FIG. 1b) if engine speed drops below or rises above preselected limits. If engine speed is the function selected (701), the accumulator 84 is loaded with the average value $A_n$ at step 702. The value in the accumulator is compared with the high and low limit values at 703 and 704 (FIG. 4h). If engine speed is within the range of the values, control is returned to the "START" routine 500 (FIG. 4b). Prior to returning, a pulse is sent on the PROG pin to assure that the indicator 250 is off (705). The timer/counter interrupt is enabled at 706 to assure constant scanning and multiplexing, and the registers are initiallized at 707 as in step 514 described above. The interrupt is then disabled at 708 and the flag F1 is set to "0" to signify that the program is no longer in the "UPDATE" routine (step 709). If the engine speed is not within the range, the indicator 250 is turned on at step 710 by sending a pulse on the READ pin 290 described above.

When a function other than engine speed has been selected, the "ESPDM" routine 700 counts the number of falling edges on the engine speed signal on the line 66 for a single window (FIG. 4f–4g) in a manner generally identical to that used with the "START" routine 500, except the time of the window is cut in half to minimize the time required for the "ESPDM" routine. Therefore each pulse counted on the line 66 represents 20 RPM instead of 10. The count is stored in the R5' register at step 720 (FIG. 4g) and after the window is complete (721–722) is compared with the preselected limits at steps 723-725 to provide a pulse on the READ pin if engine speed is not within the desired range. If engine speed is within the range (725), control is returned to the "START" routine as described above. If no rising edge is detected on the engine speed signal after a predetermined time (730, FIG. 4g), the lamp 250 is flashed.

The "ESPDM" routine 700 allows the engine speed to be constantly monitored to control the warning lamp 250 regardless of the function selected by the switches 130-136. It should be noted that the pulse count provided by the "ESPDM" routine in the register R5' is not used to update the display 152 but merely controls the lamp 250. The display 152 is multiplexed and the function switches are scanned at steps 732-737 of the "ESPDM" routine.

Having fully described the preferred embodiment, it will be apparent that many modifications and variations may be effected without departing from the scope of the novel concepts of this invention. Although reference is made to a specific microprocessor and flow chart, it will be apparent to one skilled in the art that numerous programming methods and techniques may be used without departing from the scope of the claims below. Discrete components and other forms of large scale integration rather than a processor may also be used.

We claim:

1. In a tachometer: a rotating member, first means for providing an first electrical signal indicative of the speed of rotation of the member, second means responsive to the first electrical signal for providing successive digital signals representative of the speed of rotation during successive time intervals, third means for averaging the successive digital signals and providing an average value, storage means for storing the average value, fourth means for comparing the most recent digital signal with the average value and updating the stored average with the most recent signal if the difference between the average value and the most recent signal is less a predetermined amount or alternately replacing the stored average with the most recent digital signal if the difference is greater than or equal to the predetermined amount, and fifth means responsive to the contents of the storage means for providing an output signal indicative of the speed of rotation of the member.

2. The device as set forth in claim 1 wherein the third means provides a running total weighted average of the digital signals with the latest digital signal getting the most weight.

3. The device as set forth in claim 2 wherein the running total weighted average, $A_n$, is computed according to the following equation:

$$A_n = \frac{1}{2}[X_n + \frac{1}{2}X_{n-1}(\frac{1}{2})^2 X_{n-2} + (\frac{1}{2})^3 X_{n-3} + \ldots]$$

where $X_n$ is the nth digital signal.

4. The device as set forth in claim 1 wherein the first means provides an electrical signal with pulses occurring at a rate depending on the speed of rotation having rising and falling edges, and wherein the second means includes counter means operating a predetermined period of time for counting at least the number of either rising or falling edges occurring in said period of time.

5. The device as set forth in claim 4 wherein the beginning of the predetermined period of time is synchronized with one of the edges.

6. The device as set forth in claim 5 wherein the counter means counts only falling edges, and the predetermined period of time is synchronized with a rising edge.

7. The device as set forth in claim 1 further comprising means for adjusting the response of the second means.

8. A speed measuring device comprising;
   means for providing an a-c electrical signal having a frequency proportional to speed,
   means for establishing a succession of clock periods,
   means for counting the number of electrical signal cycles occurring during a clock period and providing a digital signal indicative thereof;
   means for weighting a plurality of the digital signals and providing a weighted average signal therefrom,
   display means selectively responsive to the digital signal or the weighted average signal for providing an indication of the speed,
   means for comparing the weighted average signal with the most recent digital signal and selecting the display means to be responsive to the weighted average signal including the most recent digital signal if the most recent digital signal differs by less than a predetermined amount from the compared weighted average, or alternatively selecting the display means to be responsive to the most recent digital signal if it differs by more than the predetermined amount from the compared weighted average.

9. The device as set forth in claim 8 wherein the means for weighting the digital signals includes means for providing the most recent digital signal with the most weight.

10. The device as set forth in claim 9 wherein each of the previous digital signals are included in the weighted average signal, each previous digital signal decreasing in weight as a new digital signal is included in the average.

11. An instrument for measuring speed of a device, comprising:
    speed responsive means for providing an a-c signal having a frequency proportional to the speed of the device,
    means for providing time windows;
    means for providing a speed indicative signal responsive to the frequency of the a-c signal during the time window;
    averaging means for receiving and averaging successive speed indicative signals and providing an average value signal;
    display register means for selectively receiving the average value signal or the speed indicative signal;
    means for comparing the average value signal with the most recent speed indicative signal and transmitting said most recent speed indicative signal to the averaging means for providing an updated average value signal to the display register means if said average value and most recent speed indicative signals differ by less than a predetermined amount or, alternately, if said average value and most recent speed indicative signals differ by more than the predetermined amount, entering said most recent speed indicative signal into the display register means; and
    indicator means responsive to the contents of the display register means for providing an indication of the speed of the device.

12. The instrument as set forth in claim 11 wherein the instrument includes a processor having program memory means for storing program instructions and executing the instructions at a predetermined rate, and wherein the means for providing time windows includes counter means for providing a count representative of the number of instructions executed.

13. The instrument as set forth in claim 12 wherein the program memory means includes a pulse counting routine, and the time windows are provided by executing the routine a preselected number of times.

14. The instrument as set forth in claim 11 further comprising programmable switch means for adjusting the length of the time window.

15. The instrument as set forth in claim 11 wherein the speed responsive means comprises an a-c signal generator responsive to the movement of the device, and a square wave generator connected to the a-c signal generator.

16. The instrument as set forth in claim 15 further comprising a low pass filter connecting the signal generator and the square wave generator.

17. The instrument as set forth in claim 15 or 16 wherein the square wave generator comprises a Schmitt trigger having two stable states.

18. The instrument as set forth in claim 17 wherein the Schmitt trigger is triggered between its two stable states by alternate positive and negative pulses of generally equal amplitude so that noise immunity of the trigger is approximately equal to at least twice said amplitude.

19. The instrument as set forth in claim 18 further comprising a clipping circuit for limiting the signal amplitude to the trigger.

20. The instrument as set forth in claim 19 wherein the clipping circuit limits the signal amplitude to the trigger to about ±0.6 volts and wherein the Schmitt trigger is triggered between its two stable states by alternate positive and negative pulses of approximately 0.3 volts.

21. The instrument as set forth in claim 15 wherein the means for providing a speed indicative signal comprises counting means responsive to the leading and trailing edges of the square wave generated by the square wave generator.

22. The instrument as set forth in claim 21 wherein the means for providing time windows includes means for detecting a rising edge, and means for counting the number of falling edges occurring after a rising edge and during a time window.

23. The instrument as set forth in claim 22 wherein the time window is syncronized with a rising edge.

24. An instrument for determining the speed of several devices, comprising:
first means for sensing movement and providing a plurality of first electrical signals indicative of the speeds of the devices;
processor means having a plurality of inputs connected to the first means for selectively monitoring one of the first signals, said processor means further including:
timing means for providing timing windows,
means responsive to the selected first signal for providing speed signals indicative of the speed of the device corresponding to the selected first signal during the timing window,
means for averaging a plurality of the speed signals and providing an average value signal,
display means selectively responsive to a digital signal or an average value signal for providing a speed indication therefrom, and
means for comparing the average value signal and the latest speed signal provided during the most recent timing window and selecting the display means to be responsive to said latest speed signal if the difference between said latest speed signal and the average value signal is above a preselected value, or the average value signal if the difference is below the preselected value.

25. The instrument as set forth in claim 24 wherein the processor further comprises means for preventing the display means responding to a speed or average value signal for a previously monitored first signal upon selection of another of the first signals to be monitored.

26. The instrument as set forth in claim 24 further including means for preventing a speed indication by the display means when a new first signal is selected for monitoring until a speed signal for the newly selected first signal is provided.

27. The instrument as set forth in claim 24 wherein the processor means further comprises second means for constantly monitoring one of the first signals regardless of the first signal selected.

28. The instrument as set forth in claim 27 further comprising means for providing a warning signal when the speed indicated by the constantly monitored first signal exceeds or falls below a preselected range of speeds.

29. The instrument as set forth in claim 24 wherein the display means includes a visual readout having driven light emitting elements, and means for driving the elements at a first duty cycle when the ambient light level is above a preselected level and at a second duty cycle less than the first when the ambient light level is below the preselected light level.

30. The instrument as set forth in claim 29 wherein the visual readout comprises a digital display with n digits, and wherein the processor includes means for illuminating the digits at a duty cycle of approximately 100/n percent when the ambient light is above the preselected level.

31. The instrument as set forth in claim 29 wherein the processor includes means for executing a plurality of program instructions at a preselected rate including a routine for controlling the means for driving the light emitting elements, wherein each element is driven during a first preselected number of instructions of the routine if the ambient light is above the preselected level and during a second preselected number less than the first if the ambient light is below the preselected level.

32. In a speed measuring device including a speed sensor for providing an input signal indicative of the speed to be measured, means responsive to the input signal for providing speed signals during successive time intervals, and display means responsive to the speed signals for providing an indication of the measured speed, the improvement comprising:
means for providing a running total weighted average, $A_n$ of successive speed signals according to the equation:

$$A_n = \tfrac{1}{4}[X_n + \tfrac{3}{4}X_{n-1} + (\tfrac{3}{4})^2 X_{n-2} + (\tfrac{3}{4})^3 X_{n-3} \ldots ]$$

where $X_n$ is the speed signal during the most recent time interval, n, means for comparing the most recent speed signal $X_n$ with the previous running total weighted average $A_{n-1}$, and wherein the display means is responsive to the average $A_n$ when the difference between $X_n$ and and $A_{n-1}$ is less than a preselected value and to the signal $X_n$ when the difference is greater than the preselected value.

33. In a speed measuring device including a speed sensor for providing an input signal indicative of the speed to be measured, means responsive to the input signal for providing speed signals during successive time intervals, and display means responsive to the speed signals for providing an indication of the measured speed, the improvement comprising:

means for providing a running total weighted average, $A_n$, of successive signals according to the equation:

$$A_n = \tfrac{1}{2}[X_n + \tfrac{1}{2}X_{n-1} + (\tfrac{1}{2})^2 X_{n-2} + (\tfrac{1}{2})^3 X_{n-3} \ldots ]$$

wherein $X_n$ is the speed signal during the most recent time interval n, and acceleration responsive means for determining the rate of change of the speed, said display means selectively responsive to the average $A_n$ when the rate of change is below a preselected rate and to the speed signal $X_n$ when the rate of change is above the preselected rate.

34. In a speed measuring device including a transducer for providing a pulse signal the frequency of which is indicative of the speed to be measured, window generating means for providing time windows, counter means for counting the number of pulses occurring during a time window, and display means responsive to the count of the counter means for providing an indication of the speed, the improvement comprising:
memory means for storing a plurality of timing signals each representing a predetermined period of time;
programmable switch means for selecting one of the timing signals from the memory means; and
wherein said window generating means is responsive to the timing signal selected by the programmable switch means to provide a time window of a length equal to the period of time represented by the selected signal.

35. The device as set forth in claim 34 wherein the programmable switch means comprises n two-position switches for providing an n-bit binary word, and wherein the timing signal is selected from the memory means according to the value of the binary word.

36. The device as set forth in claim 35 wherein at least one switch comprises a units conversion switch for selectively providing the indication of speed in one of two units of measurement.

37. The device as set forth in claim 36 wherein the units of measurement are kilometers per hour and miles per hour.

38. A device for providing a measurement of the speed of a moving member, comprising:
signal generator means for providing a pulse signal having a pulse rate proportional to the speed of the member,
clock means for providing successive time intervals,
counter means for counting the number of pulses occurring during the time intervals,
means responsive to the count of the counter means for providing an average signal indicative of an average count per time interval during a plurality of time intervals,
acceleration responsive means for determining if acceleration of the moving member exceeds a preselected limit or is less than the preselected limit,
display means automatically responsive to the count of the counter means when the acceleration exceeds the preselected limit and to the average value signal when the acceleration is less than the preselected limit for providing an indication of the speed of the member.

39. The device as set forth in claim 38 wherein the acceleration responsive means comprises means for comparing the count of the counter means during one of the time intervals with the average value signal.

40. A speed measuring device comprising:
first means for providing speed signals representative of the speed to be measured;
second means responsive to the first means for providing an average value signal representative of the average value of the speed signals;
third means responsive to the speed signals for providing an acceleration indication;
display means associated with the first, second and third means selectively responsive to the average value signal when the indicated acceleration is below a preselected value and to the speed signals when the indicated acceleration is above the preselected value for providing an indication of the speed.

41. The device as set forth in claim 40 wherein the third means includes means for comparing the average value signal with the most recent speed signal provided by the first means.

42. The device as set forth in claims 40 or 41 wherein the average value is a running total weighted average of the speed signals and wherein the most recent speed signal given the most weight in the average.

43. The device as set forth in claim 42 wherein the average value signal ($A_n$) is determined according to the equation:

$$A_n = \tfrac{1}{2}[X_n + \tfrac{1}{2}X_{n-1} + (\tfrac{1}{2})^2 X_{n-2} + (\tfrac{1}{2})^3 X_{n-3} \ldots ]$$

where $X_n$ is the most recent speed signal.

44. A method of measuring the speed of a device, including the steps of:
providing first speed signals indicative of the speed of the device during successive time intervals;
providing an average value signal indicative of the average value of the speed of the device;
determining if acceleration of the device is above or below a preselected level of acceleration;
outputting to a user device an indication of the average value signal if the acceleration is below the preselected value, or alternatively, outputting to the user device an indication of one of the first speed signals if the acceleration is above the preselected value.

45. The method as set forth in claim 44 wherein the step of providing an average value signal includes averaging a plurality of the first speed signals.

46. The method as set forth in claim 44 wherein the step of determining includes comparing the average value signal with the most recent speed signal.

47. The method as set forth in claims 44 or 46 wherein the step of providing an average value signal includes providing a running total weighted average of the first speed signals, with the most recent speed signals given the most weight.

48. A methd of measuring the speed of a driven device wherein the speed is a function of both angular velocity of a drive shaft and size of a driven member, the method including the steps of:
providing a plurality of successive clock periods;
adjusting the length of the clock periods in accordance with the size of the driven member;
providing pulses the frequency of which is dependent on the angular velocity of the drive shaft;
counting the number of pulses occurring during each clock period; and
providing an indication of the speed from the pulse counts.

49. The method as set forth in claim 48 wherein the step of adjusting the length of the clock periods includes the steps of:
storing a plurality of binary values at locations in a memory;
selecting a binary value according to driven member size;
loading the binary value into a register; and
decrementing the register during regular intervals of time until the register reaches a preselected value.

50. The method as set forth in claim 49 wherein the step of decrementing includes operating a processor in cycles at a preselected instruction rate and subtracting from the register during each cycle.

51. A method for measuring the speed of a device, including the steps of:
providing a plurality of clock periods;
providing pulses the frequency of which are dependent on the speed of the device;
counting the number of pulses occurring during each clock period to provide a first speed signal for each period;
averaging the pulse counts for a plurality of clock perids to provide an average speed signal;
comparing the average speed signal with the first speed signal;
providing a speed indication responsive to the most recent first speed signal if the difference between the compared average and first speed signals is greater than a preselected limit, or alternatively, providing a speed indication responsive to the average speed signal if the difference is less than the preselected limit.

52. The method as set forth in claim 51 wherein the step of averaging includes providing a running total weighted average of the pulse counts.

53. The method as set forth in claim 52 wherein the weighted average ($A_n$) is provided according to the following equation:

$$A_n = \tfrac{3}{4}[X_n + \tfrac{3}{4}X_{n-1} + (\tfrac{3}{4})^2 X_{n-2} + (\tfrac{3}{4})^3 X_{n-3} \cdots ]$$

where $X_n$ is the most recent first speed signal.

* * * * *

UNITED STATES PATENT AND TRADEMARK OFFICE
CERTIFICATE OF CORRECTION

PATENT NO. : 4,281,388
DATED : July 28, 1981
INVENTOR(S) : K.D. Friend, D.W. Gadtke, and D.H. Ziegler It is certified that error appears in the above—identified patent and that said Letters Patent is hereby corrected as shown below:

Column 13, line 28, delete "an" and insert -- a --.

Column 13, line 54, after "1", insert -- + --.

Column 14, line 6, delete ";" and insert -- : --.

Column 14, line 12, delete ";" and insert -- , --.

Column 16, line 14, after "means" insert -- from --.

Column 17, line 4, delete "and" second occurence.

Column 17, line 16, after "successive" insert -- speed --.

Column 18, line 38, after "signal" insert -- is --.

Column 20, line 10, delete "perids" and insert -- periods --.

Signed and Sealed this

Sixth Day of April 1982

[SEAL]

Attest:

GERALD J. MOSSINGHOFF

Attesting Officer    Commissioner of Patents and Trademarks